(12) United States Patent
Matsuoka et al.

(10) Patent No.: US 10,518,348 B2
(45) Date of Patent: Dec. 31, 2019

(54) ARC WELDING CONTROL METHOD AND ARC WELDING DEVICE

(71) Applicant: Panasonic Intellectual Property Management Co., Ltd., Osaka (JP)

(72) Inventors: Noriyuki Matsuoka, Osaka (JP); Yukinori Hirota, Hyogo (JP); Atsuhiro Kawamoto, Hyogo (JP); Junji Fujiwara, Osaka (JP); Masaru Kowa, Osaka (JP); Akira Nakagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1038 days.

(21) Appl. No.: 14/220,414

(22) Filed: Mar. 20, 2014

(65) Prior Publication Data

US 2014/0203004 A1 Jul. 24, 2014

Related U.S. Application Data

(63) Continuation of application No. PCT/JP2013/001381, filed on Mar. 6, 2013.

(30) Foreign Application Priority Data

Mar. 27, 2012 (JP) .................. 2012-070806

(51) Int. Cl.
*B23K 9/09* (2006.01)
*B23K 9/073* (2006.01)
*B23K 9/095* (2006.01)

(52) U.S. Cl.
CPC .............. *B23K 9/092* (2013.01); *B23K 9/073* (2013.01); *B23K 9/095* (2013.01); *B23K 9/0953* (2013.01); *B23K 9/0956* (2013.01)

(58) Field of Classification Search
CPC ........ B23K 9/092; B23K 9/073; B23K 9/095; B23K 9/0953; B23K 9/0956; B23K 9/09; B23K 9/091; B23K 9/0738
(Continued)

(56) References Cited

U.S. PATENT DOCUMENTS

RE33,330 E * 9/1990 Ogasawara .......... B23K 9/0956
219/130.21
5,148,001 A * 9/1992 Stava .................... B23K 9/0732
219/130.1

(Continued)

FOREIGN PATENT DOCUMENTS

CN 1984742 6/2007
CN 101309773 11/2008
(Continued)

OTHER PUBLICATIONS

International Search Report for PCT/JP2013/001381 dated Apr. 16, 2013.
(Continued)

*Primary Examiner* — Tu B Hoang
*Assistant Examiner* — Alba T Rosario-Aponte
(74) *Attorney, Agent, or Firm* — Wenderoth, Lind & Ponack, L.L.P.

(57) ABSTRACT

In arc welding, determining a current value to be high in an early stage of the arc period is effective in reducing spatters caused by feeble short circuit in the arc period. In that case, to sharply decrease the voltage that has increased with increase in current, an inductance value of a reactor has to be kept small. However, a small inductance value causes a problem—weakness against disturbance. The present invention provides an arc welding control method that performs arc welding while repeating the short-circuit period and the arc period. According to the method, changing an inductance (Continued)

value relating to welding output in the arc period offers stable arc welding with fewer spatters and insusceptibility to disturbance.

5 Claims, 7 Drawing Sheets

(58) Field of Classification Search
USPC ..... 219/130.01, 130.21, 130.4, 130.5, 130.1, 219/136, 124.01, 124.02, 124.03
See application file for complete search history.

(56) References Cited

U.S. PATENT DOCUMENTS

| | | | |
|---|---|---|---|
| 2002/0190043 | A1 | 12/2002 | Rice et al. |
| 2006/0201922 | A1* | 9/2006 | Era .................. B23K 9/092 219/130.51 |
| 2006/0283847 | A1 | 12/2006 | Kawamoto et al. |
| 2007/0051714 | A1* | 3/2007 | Ou .................. B23K 9/1043 219/130.21 |
| 2008/0314884 | A1* | 12/2008 | Fujiwara .......... B23K 9/0735 219/130.51 |
| 2009/0152252 | A1 | 6/2009 | Kawamoto et al. |
| 2009/0289044 | A1 | 11/2009 | Fujiwara et al. |
| 2012/0145690 | A1 | 6/2012 | Kawamoto et al. |
| 2012/0199560 | A1* | 8/2012 | Era .................. B23K 9/0731 219/74 |

FOREIGN PATENT DOCUMENTS

| | | | |
|---|---|---|---|
| JP | 55126376 | A * | 9/1980 |
| JP | S61-253175 | A | 11/1986 |
| JP | H10-109163 | A | 4/1998 |
| JP | 2000-015441 | A | 1/2000 |
| JP | 2000015441 | A * | 1/2000 |
| JP | 2006-021227 | A | 1/2006 |
| JP | 2006-043764 | A | 2/2006 |
| JP | 2006043764 | A * | 2/2006 |
| JP | 2006-116546 | | 5/2006 |
| JP | 2006-247710 | A | 9/2006 |
| JP | 2007-216268 | A | 8/2007 |
| JP | 2009-072826 | | 4/2009 |
| JP | 2009-183988 | A | 8/2009 |
| JP | 2012-161814 | A | 8/2012 |
| WO | 2011/024380 | | 3/2011 |

OTHER PUBLICATIONS

Extended European Search Report dated Dec. 10, 2015 in European Application No. 13768138.3.
English Translation of Chinese Search Report dated Dec. 23, 2014 for the related Chinese Patent Application No. 201380004010.6.
Indian Examination Report dated Dec. 18, 2018 for the related Indian Patent Application No. 7008/CHENP/2014.

* cited by examiner

ARC WELDING CONTROL METHOD AND ARC WELDING DEVICE

BACKGROUND

1. Technical Field

The present invention relates to an arc welding control method and an arc welding device for performing welding in which an arc is generated between a welding wire as a consumable electrode and a base material as an object to be welded.

2. Background Art

In a conventional method of arc welding where welding operation is performed with an arc generated between a wire and a base material, generally, voltage is controlled in an arc period, and current is controlled in a short-circuit period. However, in such a general welding method, large amounts of spatters are generated. To reduce spatters, various methods have been suggested.

In one known method, for example, in an early stage of the arc period after release of short circuit, current is controlled for a predetermined period so as to obtain a current value higher than a current value obtained by conventional voltage control (see Japanese Unexamined Patent Application Publication No. H10-109163 as patent literature 1, for example). According to the method, the current value in the current control is set to a value so as not to exceed a current value in the short-circuit period immediately before arc regeneration, allowing droplets to be formed with stability.

Similarly, in another known method, in an early stage of the arc period after release of short circuit, current is controlled for a predetermined period (see Japanese Unexamined Patent Application Publication No. 2006-021227 as patent literature 2, for example). The current value in the current control is set to a value higher than a current value in the short-circuit period immediately before arc regeneration. This allows droplets to be formed on the tip of the wire in the early stage of the arc period, facilitating occurrence of next short circuit. According to the method, facilitating occurrence of next short circuit decreases welding voltage and broadens application range for high-speed welding and gap welding.

Similarly, in still another known method, in an early stage of the arc period after release of short circuit, current is controlled for a predetermined period (see Japanese Unexamined Patent Application Publication No. 2009-183988 as patent literature 3, for example). The method employs a current control in which a welding current according to a short-circuit release current is fed for a predetermined time and a current control in which a welding current is set to a fixed value with no regard to a short-circuit release current and the fixed welding current is fed for a predetermined time. The current control above is differently used in the arc start period and the steady-state welding period, allowing spatters to be further reduced.

Patent literatures 1 through 3 suggest below in common. That is, in an early stage of the arc period after release of short circuit, current is controlled for a predetermined period so that the current value is kept higher than a current value fed in a conventional voltage control. Although patent literatures 1 through 3 have difference in determining the current value in the current-controlled period, all of them employ high current values, by which occurrence of short circuit in an early stage of the arc period is suppressed and spatters are reduced.

FIG. 7 shows a current waveform when welding is performed by using the welding output control method described in patent literature 1. The horizontal axis shows elapsed time and the vertical axis shows welding current. In FIG. 7, numeral 101 indicates a short-circuit period where short circuit occurs between the wire and the base material, and numeral 102 indicates an arc period where an arc is generated between the wire and the base material. Besides, in FIG. 7, numeral 103 indicates an arc regeneration time at which an arc is generated again after release of short circuit, numeral 104 indicates electric current immediately before arc regeneration, numeral 105 indicates early-stage electric current after arc regeneration, and numeral 106 indicates a constant current-controlled period.

Next, the waveform of electric current shown in FIG. 7 will be described in relation to the control method on the basis of elapsed time. As shown in FIG. 7, voltage control allows the welding current value to have a gradual decrease for a predetermined time starting from arc regeneration time 103. After the passage of the predetermined time, the electric current is increased to have a high value by current control. The electric current value in the current control, as shown in FIG. 7, is set to a value so as not to exceed a current value immediately before arc regeneration, and according to the method, the controlled current value enables droplets to be formed with stability. After constant current-controlled period 106 is completed, the arc control (i.e. voltage control) follows. Performing the current control above suppresses the occurrence of short circuit immediately after release of short circuit, reducing spatters.

SUMMARY

Patent literatures 1 through 3 suggest that, in an early stage of the arc period after release of short circuit, current control should be performed for a predetermined period so as to have a current value higher than a current value obtained by conventional voltage control. Such control suppresses short circuit generated immediately after arc regeneration, decreasing spatters. The decrease in spatters reduces spatters onto the base material and jigs, increasing welding quality and maintainability.

To reduce spatters, it is effective that the current value in an early stage of the arc period is set to a high value. However, to increase the occurrence frequency of short circuit for enhancing periodicity, the voltage value in the early stage of the arc period has to have a sharp decrease. To cope with such a sharp decrease of voltage, the inductance value of a reactor has to be small. However, decreasing the inductance value of a reactor causes a sensitive reaction in current to a slight change in voltage. As a result, current largely changes according to the condition of a base material and a welding environment, inviting no arc in the worst case. That is, decreasing the inductance value of a reactor causes a problem—weakness against disturbance.

In contrast, increasing the inductance value of a reactor impairs voltage response characteristics and therefore fails to decrease the voltage value in the early stage of the arc period. This makes the arc period longer, increasing occurrence of feeble short circuit and therefore increasing spatters. Besides, increase in feeble short circuit causes variations in lengths of arc periods, which decreases periodicity and causes unstable welding. Further, due to such an extended arc period, the occurrence frequency of short circuit decreases and welding voltage easily becomes high. Such a high welding voltage causes nonuniform bead width, particularly, in high-speed welding. Further, in gap welding, it causes burn through and the like because heat input cannot be decreased.

To address the problems above, according to the arc welding control method that performs arc welding while repeating the short-circuit period and the arc period, the inductance value relating to welding output is changed in the arc period.

Further, current control is performed for a predetermined period from the start of the arc period, and then voltage control is performed for the arc period after the predetermined period. The inductance value relating to welding output is changed in the voltage-controlled period.

Still further, the inductance value relating to welding output is changed two or more times.

Yet further, the inductance value relating to welding output is determined to be larger as the number of times of changing inductance values increases.

Still further, when a constriction phenomenon as a sign indicating the end of the short-circuit period is detected, welding current is decreased. On the completion of the short-circuit period, the welding current is increased to a predetermined level by current control, and after the welding current has reached a predetermined level, voltage control is performed. The inductance value used for a predetermined period after the start of the voltage control is set to a first inductance value, and after the predetermined period, the inductance value is changed to a second inductance value.

Yet further, the welding current—which is increased to a predetermined level by current control on the completion of the short-circuit period—has magnitude greater than that of welding current at decrease-starting time at which a constriction phenomenon as a sign indicating the end of a short-circuit period is detected.

Still further, the inductance value is changed by electronic reactor control.

Yet further, the inductance value relating to welding output is obtained by adding an inductance value of a reactor disposed in an arc welding device for performing arc welding to an inductance value of an electronic reactor on the electronic reactor control.

Still further, an inductance value of a reactor disposed in the arc welding device for performing arc welding is employed for the inductance value relating to welding output in the short-circuit period.

The arc welding device of the present invention is an arc welding device that performs arc welding while repeating the short-circuit period and the arc period. The arc welding device of the present invention has a primary rectifier, a switching section, a transformer, a secondary rectifier, a DC reactor, a driver, a welding voltage detector, a welding current detector, a short-circuit/arc detector, a short-circuit controller, an arc controller, a timer, a plurality of electronic reactors, and a selector. The arc welding device of the present invention changes the inductance value relating to welding output in the arc period. The primary rectifier rectifies received electric power. The switching section converts the output of the primary rectifier into AC. The transformer steps down the output of the switching section, and the secondary rectifier and the DC reactor rectify the output of the transformer. The driver controls the switching section. The welding voltage detector detects welding voltage and the welding current detector detects welding current. The short-circuit/arc detector determines whether the welding state is in the short-circuit period or in the arc period according to output from the welding voltage detector and/or the welding current detector. The short-circuit controller controls welding output in the short-circuit period according to the output from the short-circuit/arc detector. The arc controller controls welding output in the arc period according to the output from the short-circuit/arc detector. The timer measures elapsed time from the start of the arc period. The selector selects one electronic reactor from the two-or-more electronic reactors according to the measurement result fed from the timer.

Further, current control is performed for a predetermined period from the start of the arc period, and then voltage control is performed for the arc period after the predetermined period. The inductance value relating to welding output is changed in the voltage-controlled period.

Still further, the inductance value relating to welding output is changed two or more times.

Yet further, the inductance value relating to welding output is obtained by adding an inductance value of a reactor disposed in an arc welding device for performing arc welding to an inductance value of an electronic reactor on the electronic reactor control.

According to the present invention, current control is performed for a predetermined period from the start of the arc period so as to have a current value higher than a current value obtained by conventional voltage control, which decreases spatters. The inductance value used for a predetermined period from the start of the arc period is set to a value smaller than an inductance value used for a period after the predetermined period. This enables welding output voltage increased in the current-controlled period to have a sharp decrease, increasing the occurrence frequency of short circuit, and accordingly, enhancing periodicity. This also enables welding voltage to decrease.

After the predetermined period, the inductance value used in the period is changed to be greater so as to reduce change in welding current against disturbance, such as arc blow, caused by condition of a base material. That is, arc welding insusceptible to disturbance is obtained.

As described above, changing the inductance value in the arc period offers arc welding having fewer spatters, insusceptibility to disturbance, and also increases the speed of welding operation.

DETAILED DESCRIPTION OF THE PREFERRED EMBODIMENTS

First Exemplary Embodiment

Figure 1:
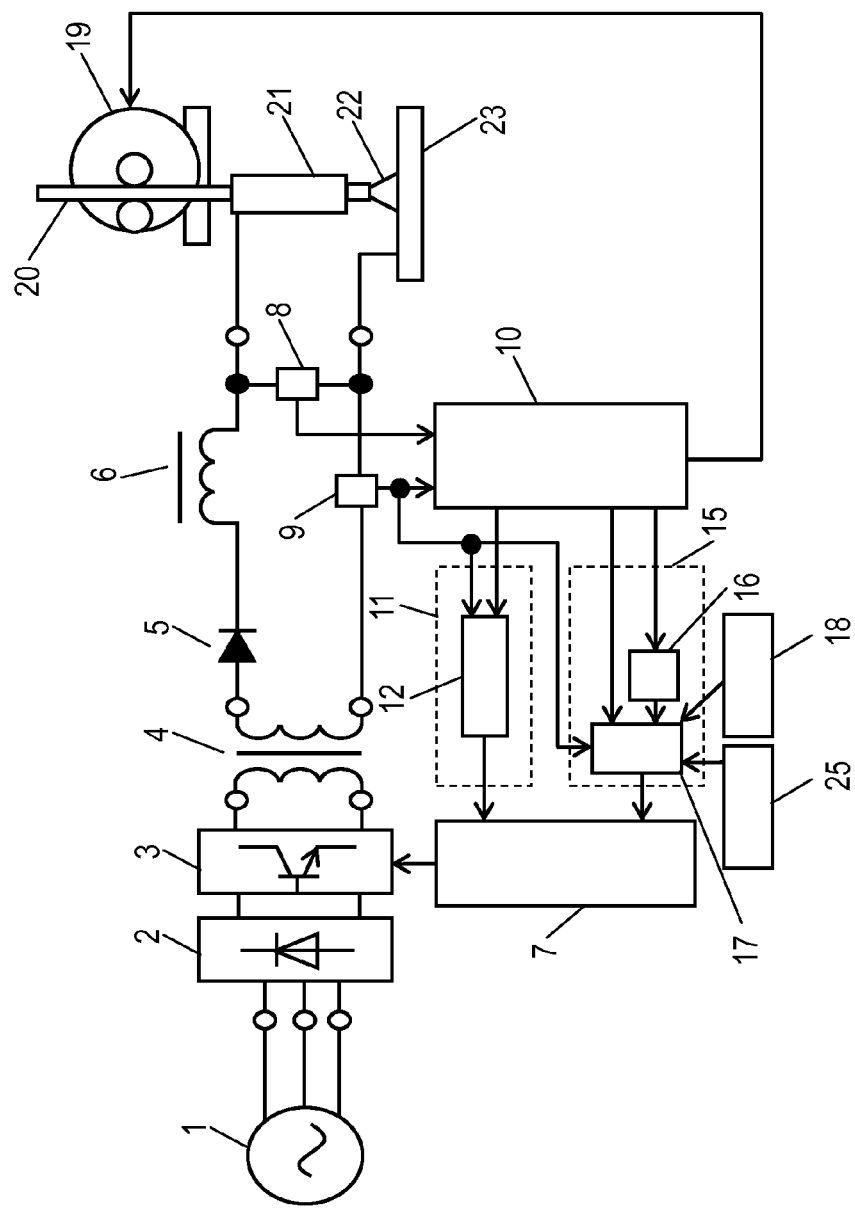
FIG. 1 shows a general structure of an arc welding device in accordance with a first exemplary embodiment of the present invention.

The arc welding device of the exemplary embodiment is described with reference to FIG. 1. FIG. 1 shows a general structure of the arc welding device in accordance with the first exemplary embodiment.

Electric power fed from input power source 1 is rectified in primary rectifier 2, converted into AC by switching section 3, stepped down by transformer 4, rectified by secondary rectifier 5 and DCL 6 (inductance, coil), and applied between wire 20 and base material 23. DCL 6 is a DC reactor having a fixed value of inductance.

Besides, the arc welding device of the exemplary embodiment contains driver 7 for controlling switching section 3, and welding voltage detector 8 that is connected between welding power source output terminals and detects welding voltage. Further, the arc welding device of the exemplary embodiment contains welding current detector 9 for detecting welding current and short-circuit/arc detector 10 for determining whether the short-circuit period or the arc period according to a signal from welding voltage detector 8 and/or a signal from welding current detector 9. Further, the arc welding device of the exemplary embodiment contains short-circuit controller 11 that outputs a control signal for current in the short-circuit period and arc controller 15 that outputs a control signal for current and voltage in the arc period.

Short-circuit controller 11 has short-circuit current controller 12 that outputs a current control signal to driver 7. Arc controller 15 has timer 16 for measuring time and selector 17 for changing the inductance value of an electronic reactor used in the arc period according to the signal from timer 16. Selector 17 selects an inductance value of any one of first electronic reactor 18 and second electronic reactor 25 in a manner described below, and outputs a welding output control signal to driver 7 according to the inductance value of the selected electronic reactor.

Second electronic reactor 25 has an inductance value smaller than that of first electronic reactor 18. The inductance value of first electronic reactor 18 and the inductance value of second electronic reactor 25 are determined by a table or a mathematical expression according to set current or a set wire feeding rate, for example. When the inductance value is determined by a mathematical expression under the same condition of set current and set wire feeding rate, changing a coefficient of the expression allows the inductance value of first electronic reactor 18 to be different from that of second electronic reactor 25. The inductance value of first electronic reactor 18 and the inductance value of second electronic reactor 25 are greater than the inductance value of DCL 6.

Wire 20 is fed toward base material 23 by wire feeding motor 19. Electric power is supplied to wire 20 via tip 21, by which welding arc 22 is generated between wire 20 and base material 23.

Each component section forming the arc welding device shown in FIG. 1 may be an independent structure or may be a composite structure formed of a plurality of component sections.

Figure 2:
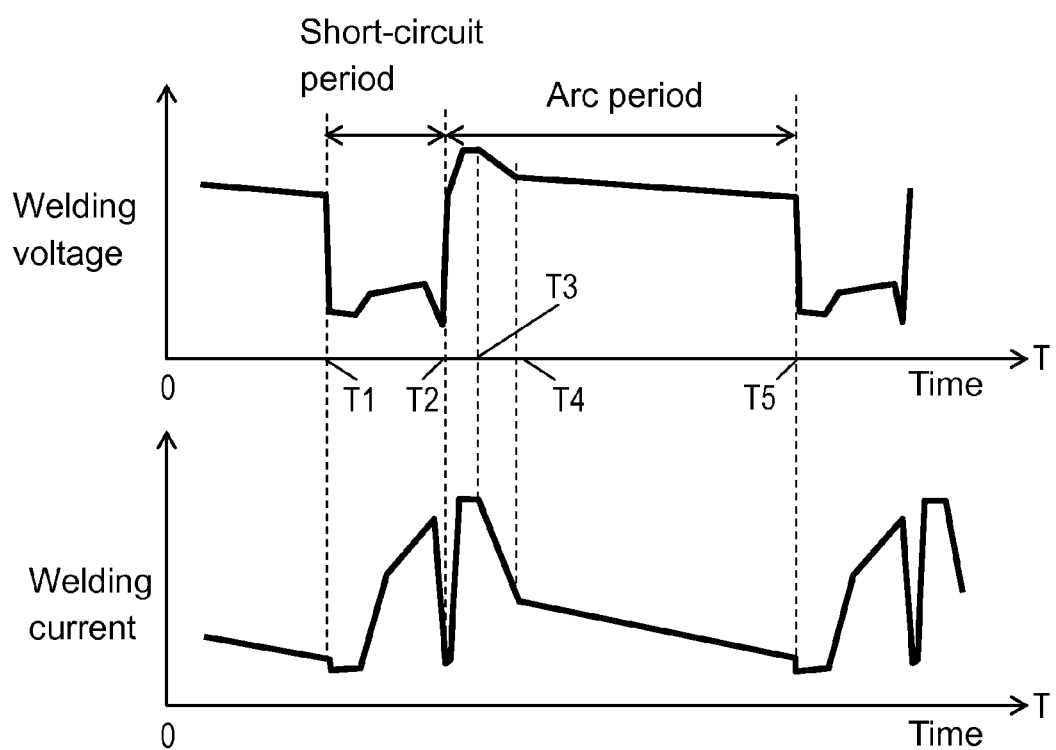
FIG. 2 shows a welding current waveform and a welding voltage waveform in accordance with the first exemplary embodiment of the present invention.

Next, welding control after determination of short-circuit/arc detector 10 will be described with reference to FIG. 1 and FIG. 2. In FIG. 2, time T1 indicates the time at which short circuit occurs and time T2 indicates the time of arc regeneration after release of the short circuit. The period from time T1 to time T2 is the short-circuit period, and the period from time T2 to time T5 is the arc period. In the arc period, current control is performed from time T2 of arc regeneration. Voltage control starts at time T3 and continues until the next short circuit occurs. The voltage control is performed while using different electronic reactors in the following periods: the period from time T3 to time T4 at which a predetermined time elapses; and the period from time T4 to time T5 at which the next short circuit occurs. In the short-circuit period from time T1 to time T2, short-circuit controller 11 supplies wire 20 with welding current for releasing the short-circuit condition formed by connecting wire 20 with a molten pool (not shown). Therefore, short-circuit controller 11 is formed of short-circuit current controller 12 for controlling current in the short-circuit period.

In the arc period from time T2 to time T5, timer 16 receives information from short-circuit/arc detector 10. According to the information, timer 16 measures the time from time T2 to time T3, the time from time T3 to time T4, and the time from time T4 to time T5 in the arc period. Timer 16 sends the measurement information to selector 17. In the second predetermined period (i.e., the period from time T3 and time T4), selector 17 selects the inductance value of second electronic reactor 25. In the third predetermined period (i.e., the period from time T4—at which the second predetermined period has elapsed—to time T5), selector 17 selects the inductance value of first electronic reactor 18. Selector 17 outputs a welding output control signal to driver 7 according to the inductance value of the selected electronic reactor.

The inductance value relating to welding output used for the second predetermined period is the sum of the inductance value of DCL 6 and the inductance value of second electronic reactor 25. The inductance value relating to welding output used for the third predetermined period is the sum of the inductance value of DCL 6 and the inductance value of first electronic reactor 18. In the first predetermined period from time T2 to time T3, the inductance value of DCL 6 is employed for the inductance value relating to welding output.

Figure 3:
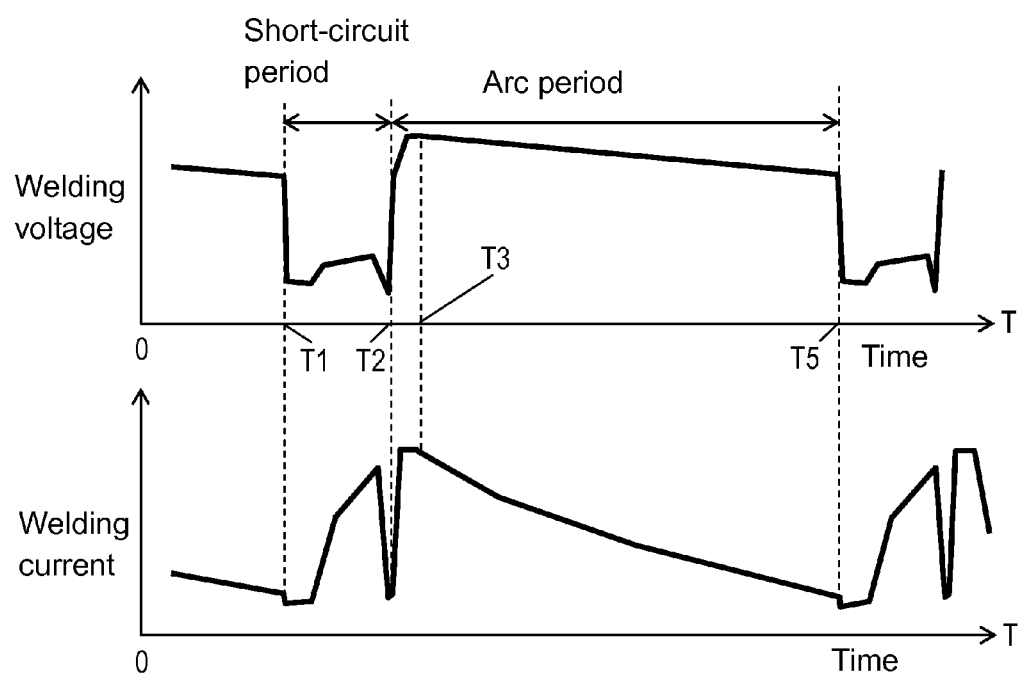
FIG. 3 shows a welding current waveform and a welding voltage waveform in accordance with the first exemplary embodiment of the present invention.
Figure 4:
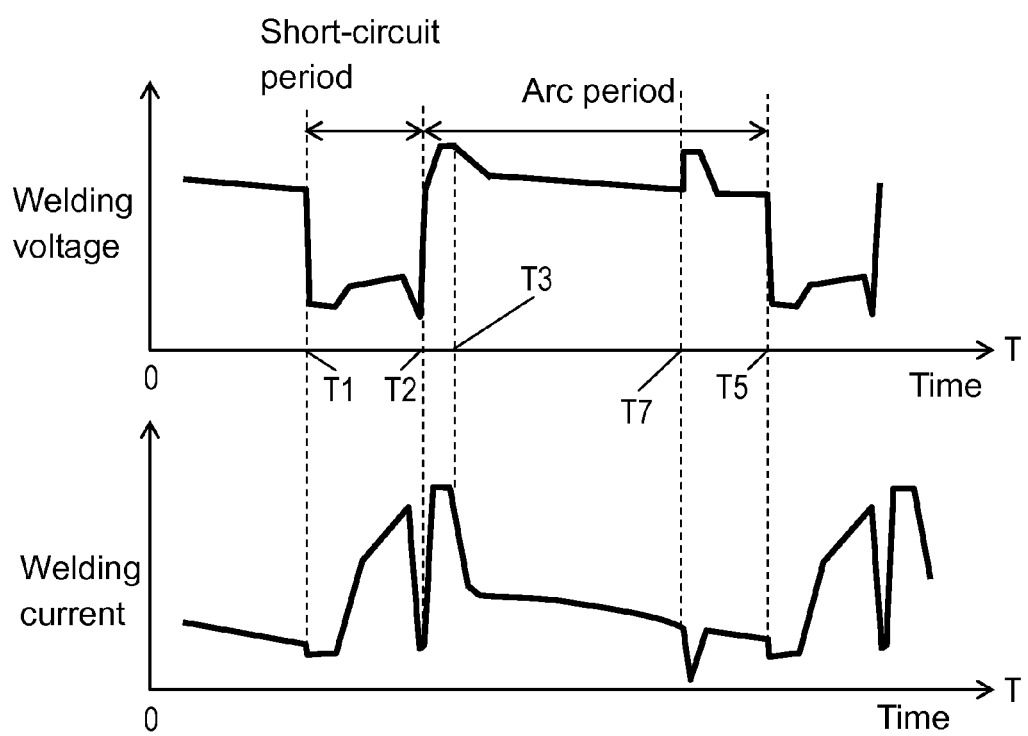
FIG. 4 shows a welding current waveform and a welding voltage waveform in accordance with the first exemplary embodiment of the present invention.

As described above, a desired welding waveform is obtained by changing the inductance value of an electronic reactor in the arc period. Particularly, under the state where the current in an early stage of the arc period after release of short circuit is set to a high value, the welding voltage and the welding current when the inductance value is determined to be large and fixed to a single value are represented by the waveforms in FIG. 3. As is shown by the waveform immediately after time T3, the increased voltage after release of short circuit has no sharp decrease. This extends the arc period, i.e., extends the time carrying low current. As a result, the next short-circuit period tends to be extended, which has easily caused variation in periodicity. In contrast, the welding voltage and the welding current when the inductance value is determined to be small and fixed to a single value are represented by the waveforms in FIG. 4. In that case, if a feeble short circuit occurs in the latter half of the arc period (i.e. in proximity to time T7 in FIG. 4), change in current with respect to change in voltage becomes large, which can cause a problem, for example, no arc.

However, according to the exemplary embodiment, in an early stage of the arc period, the inductance value of an electronic reactor is determined to be small so as to encourage the increased voltage to have a sharp decrease. Further, according to the exemplary embodiment, the inductance value of an electronic reactor is changed to be large after the decrease of voltage, which allows change in current caused by generation of feeble short circuit to keep small. This provides a stable result of welding work having insusceptibility to disturbance and high periodicity.

In FIG. 2, the period from time T1 to time T3 is the current-controlled period, and the period from time T3 to time T5 is the voltage-controlled period. Besides, the period from time T3 to time T4 is the period where second electronic reactor 25 is selected, and the period from time T4 to time T5 is the period where first electronic reactor 18 is selected.

Besides, during the short-circuit period and the period from time T2 to time T3 of the arc period, the inductance value relating to welding output is fixed to the inductance value of DCL 6. That is, the inductance value used for the aforementioned period has no influence of the inductance value of first electronic reactor 18 and the inductance value of second electronic reactor 25.

As described above, according to the arc welding control method and the arc welding device of the exemplary embodiment, current control is performed for the first predetermined period from the start of the arc period so as to have a current value higher than a current value obtained by conventional voltage control. This reduces spatters.

Further, for the second predetermined period from time T3 to time T4, the inductance value of an electronic reactor is determined to be smaller than the inductance value of an electronic reactor used for the third predetermined period from time T4 to time T5. The voltage control allows welding output voltage—which has increased in the current-controlled first predetermined period from time T2 to time T3—to have a sharp decrease. This contributes to increased frequencies of generation of short circuit, enhanced periodicity, decreased welding voltage, and increase in speed of welding operation.

Further, for the third predetermined period from time T4 to time T5, the inductance value of an electronic reactor is determined to be greater than the inductance value of an electronic reactor used for the second predetermined period from time T3 to time T4. This reduces change in welding current against disturbance, such as arc blow, caused by condition of a base material, providing arc welding with insusceptibility to disturbance.

In this way, changing the inductance values of the electronic reactors in the arc period offers stable arc welding having fewer spatters, insusceptibility to disturbance. This also decreases welding voltage, increasing the speed of welding operation.

Second Exemplary Embodiment

In the exemplary embodiment, the parts similar to those of the first exemplary embodiment have similar reference marks and the detailed description thereof may be omitted.

Figure 5:
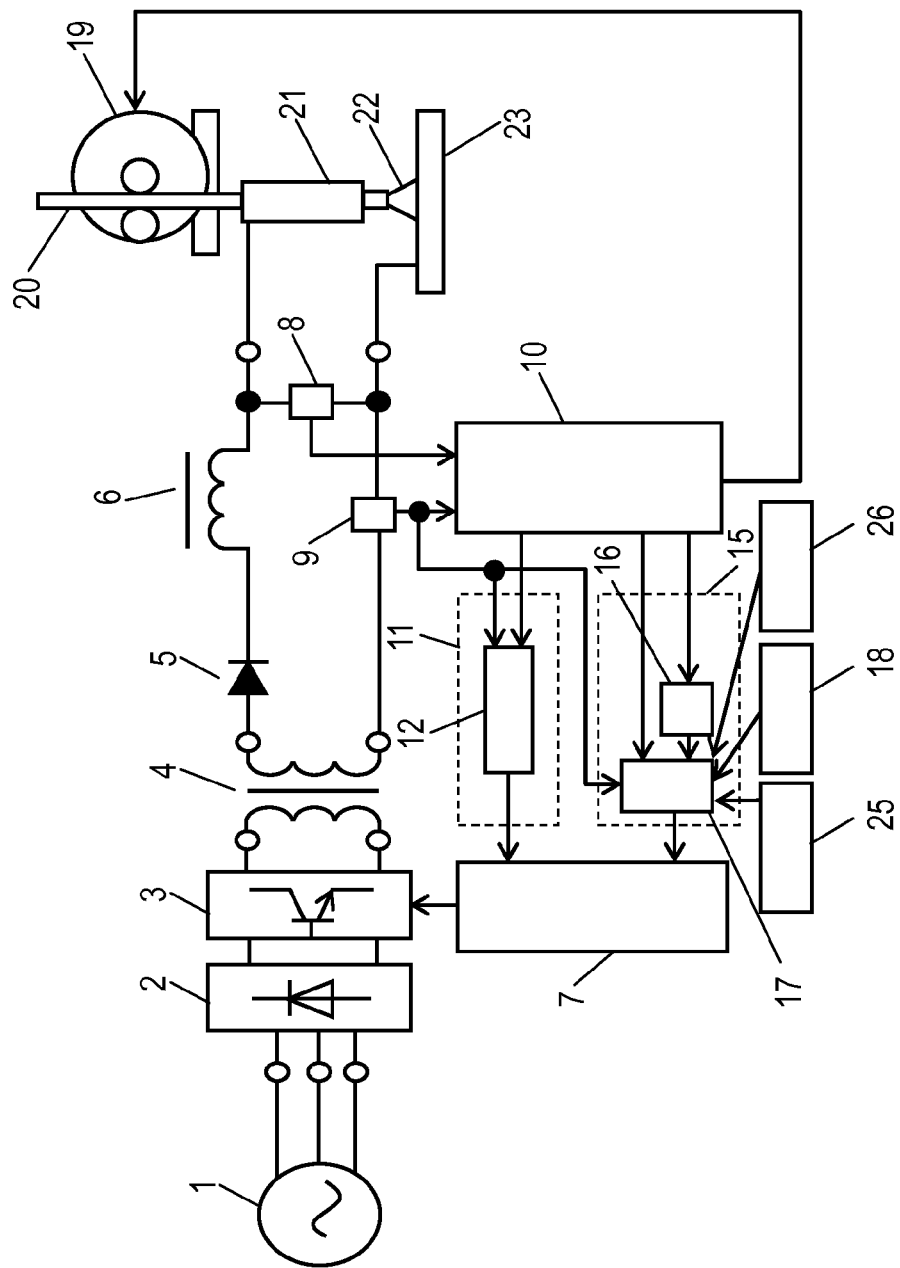
FIG. 5 shows a general structure of an arc welding device in accordance with a second exemplary embodiment of the present invention.

FIG. 5 shows a general structure of the arc welding device in accordance with the exemplary embodiment. The structure of the embodiment differs from that of the first exemplary embodiment in that third electronic reactor 26 is added. That is, the exemplary embodiment shows an example in which three inductance values of the electronic reactors are used.

As with first electronic reactor 18 and second electronic reactor 25, the inductance value of third electronic reactor 26 is determined by a table or a mathematical expression according to, for example, set current or a set wire feeding rate. The magnitude relation between the inductance values of the electronic reactors is as follows: third electronic reactor 26 has the largest value, first electronic reactor 18 follows, and second electronic reactor 25 has the smallest value.

Figure 6:
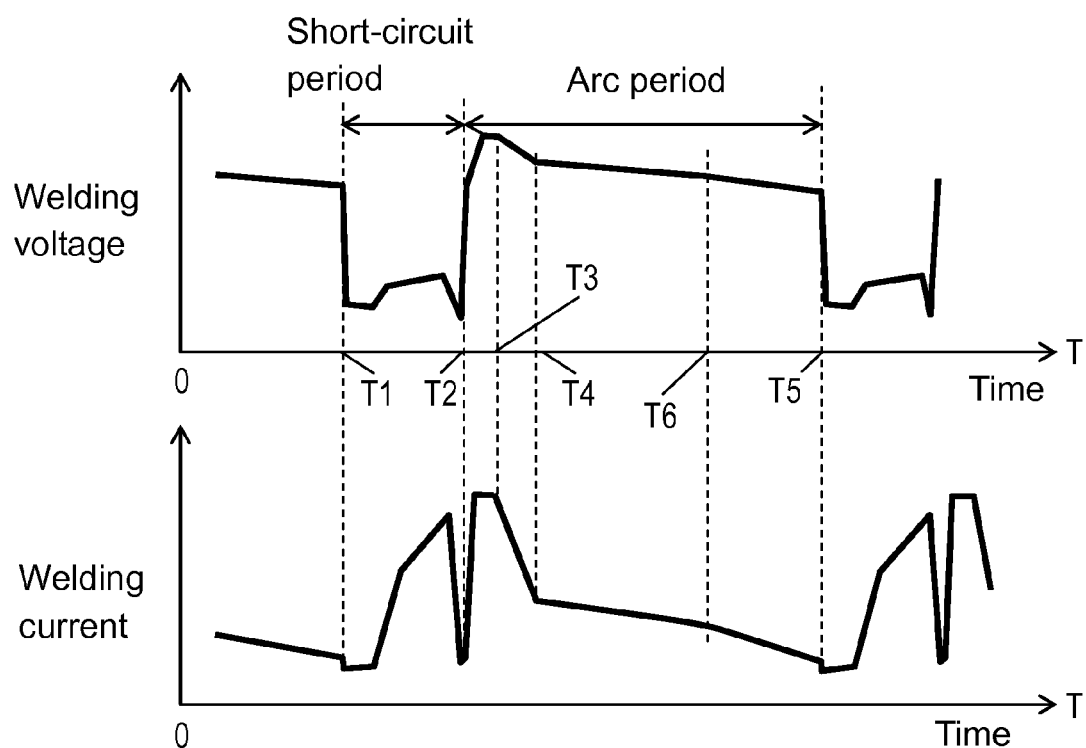
FIG. 6 shows a welding current waveform and a welding voltage waveform in accordance with the second exemplary embodiment of the present invention.
Figure 7:
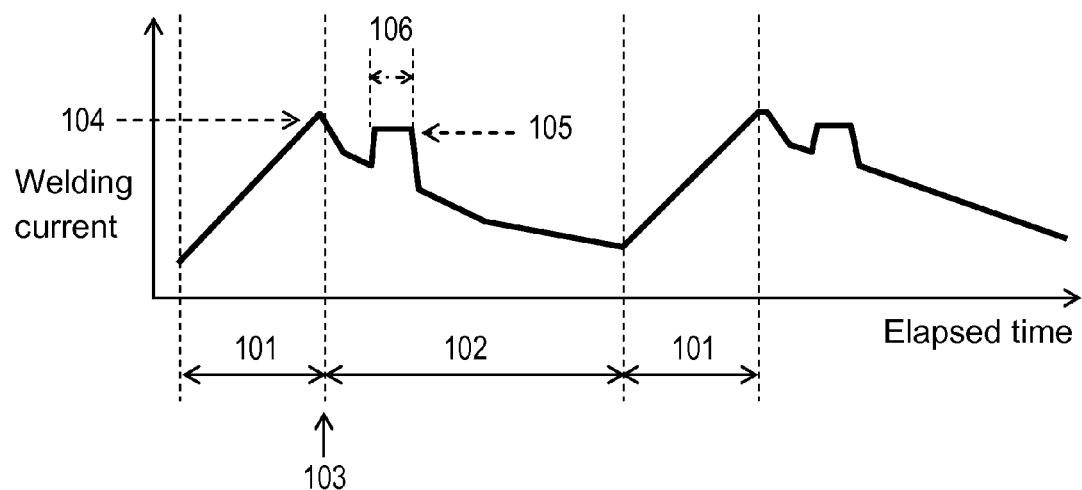
FIG. 7 shows a welding current waveform in conventional arc welding control.

In FIG. 5 and FIG. 6, in the arc period from time T2 to time T5, timer 16 receives information from short-circuit/arc detector 10. According to the information, timer 16 measures the following periods of time in the arc period: the period from time T2 to time T3; the period from time T3 to time T4; the period from time T4 to time T6; and the period from time T6 to time T5. Timer 16 sends the measurement information to selector 17. Selector 17 selects the inductance value of second electronic reactor 25 for the fifth predetermined period from time T3 to time T4. Selector 17 selects the inductance value of third electronic reactor 26 for the sixth predetermined period from time T4 to time T6. Selector 17 selects the inductance value of first electronic reactor 18 for the seventh predetermined period from time T6 to time T5. Selector 17 outputs a welding output control signal to driver 7 according to the inductance value of the determined electronic reactor.

The waveforms of welding voltage and welding current of the exemplary embodiment will be described with reference to FIG. 6. In FIG. 6, the period from time T1 to time T2 is the short-circuit period, and the period from time T2 to time T5 is the arc period; meanwhile, the period from time T1 to time T3 is the current-controlled period, and the period from time T3 to time T5 is the voltage-controlled period. Further, the period from time T3 to time T4 is the period where second electronic reactor 25 is selected; the period from time T4 to time T6 is the period where third electronic reactor 26 is selected; and the period from time T6 to time T5 is the period where first electronic reactor 18 is selected.

Second electronic reactor 25, as is shown by the waveform immediately after time T3 in FIG. 6, enables the increased voltage to have a sharp decrease. Third electronic reactor 26, as is shown by the waveform after time T4 in FIG. 6, allows change in current to keep small so as to be insusceptible to change in voltage caused by disturbance or feeble short circuit. First electronic reactor 18, as is shown by the waveform after time T6 in FIG. 6, decreases current to induce short circuit.

According to the arc welding control method and the arc welding device of the exemplary embodiment, current control is performed for the fourth predetermined period from the start of the arc period so as to have a current value higher than a current value obtained by conventional voltage control, which decreases spatters.

The inductance value used for the fifth predetermined period from time T3 to time T4 is set to a value smaller than the inductance values used for the sixth predetermined period from time T4 to time T6 and the seventh predetermined period from time T6 to time T5. This enables welding output voltage that has increased in the current-controlled period (i.e., in the fourth predetermined period from time T2 to time T3) to have a sharp decrease, increasing the frequency of generation of short circuit, and accordingly, enhancing periodicity. Further, this enables welding voltage to decrease, increasing the speed of welding operation.

In addition, the inductance value used for the sixth predetermined period from time T4 to time T6 is changed to a value greater than the inductance value of the electronic reactor selected for the fifth predetermined period from time T3 to time T4. This reduces change in welding current against disturbance, such as arc blow, caused by condition of a base material, providing arc welding with insusceptibility to disturbance.

Further, the inductance value used for the seventh predetermined period (from time T6 to time T5) is changed to a value not only greater than the inductance value of the electronic reactor selected for the fifth predetermined period (from time T3 to time T4) but also smaller than the inductance value of the electronic reactor selected for the sixth predetermined period (from time T4 to time T6). This induces short circuit.

In this way, changing the inductance values of the electronic reactors in the arc period offers arc welding having fewer spatters, insusceptibility to disturbance. This also decreases welding voltage, increasing the speed of welding operation.

As described above, the structure of the exemplary embodiment offers the effect the same as that obtained by the structure of the first exemplary embodiment. Further, the structure of the embodiment offers more delicate adjustment, compared to the case of the first exemplary embodiment.

Although the exemplary embodiment describes the structure having three electronic reactors, four or more electronic reactors may be disposed.

TABLE 1

|  | First electronic reactor | Second electronic reactor | Third electronic reactor |
|---|---|---|---|
| Two inductance values | ○ (larger) | ○ (smaller) | — |
| Three inductance values | ○ (middle) | ○ (smallest) | ○ (largest) |

Table 1 shows a relation between the inductance values of the electronic reactors described in the first and the second exemplary embodiments. The table merely shows an example and the relation may be differently determined.

According to the present invention, changing the inductance values in the arc period provides welding operation with fewer spatters and stability. This is therefore industrially useful for the arc welding control method and the arc welding device for arc welding.

What is claimed is:

1. An arc welding control method for performing arc welding while repeating a short-circuit period and an arc period, wherein the arc period comprises a first predetermined period, a second predetermined period, a third predetermined period and a fourth predetermined period, the method comprising:

performing current control with a first inductance value in the first predetermined period in the arc period after completion of the short circuit period so as to increase welding current to a predetermined level;

performing voltage control after the welding current has reached the predetermined level;

setting the inductance value relating to welding output to a second inductance value for the second predetermined period after the start of the voltage control;

setting the inductance value relating to welding output to a third inductance value for the third predetermined period after the second predetermined period, and setting the inductance value relating to welding output to a fourth inductance value for the fourth predetermined period after the third predetermined period and before a start of next short-circuit, wherein the fourth inductance value is larger than the second inductance value and smaller than the third inductance value.

2. The arc welding control method according to claim 1, wherein welding current having an increase after the short circuit period has a magnitude greater than a magnitude of welding current at decrease-starting time in response to detecting a constriction phenomenon as a sign indicating the end of the short-circuit period.

3. The arc welding control method according to claim 1, wherein the inductance value relating to welding output is changed by electronic reactor control.

4. The arc welding control method according to claim 3, wherein the inductance value relating to the welding output is obtained by adding the inductance value of a reactor disposed in an arc welding device for performing arc welding to an inductance value of an electronic reactor on the electronic reactor control.

5. The arc welding control method according to claim 1, wherein the inductance value relating to welding output in the short-circuit period and the inductance value relating to the first predetermined period are determined to an inductance value of a reactor disposed in an arc welding device for performing arc welding.

* * * * *